March 13, 1934.　　　G. A. BIGGS　　　1,950,775
HYDRAULIC TURBINE
Filed Dec. 15, 1932　　　2 Sheets-Sheet 1
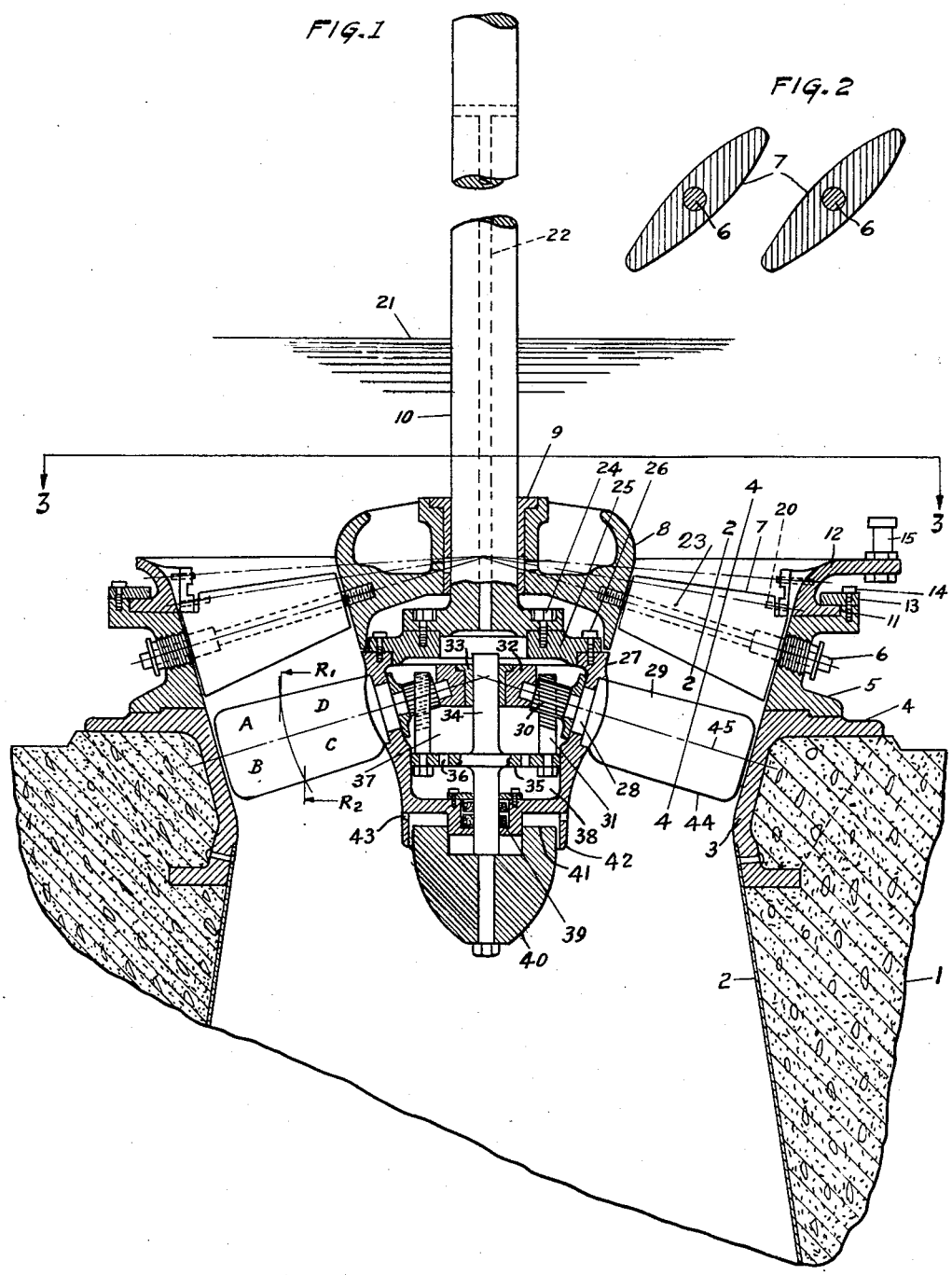
INVENTOR
GEORGE A. BIGGS.
BY
ATTORNEYS

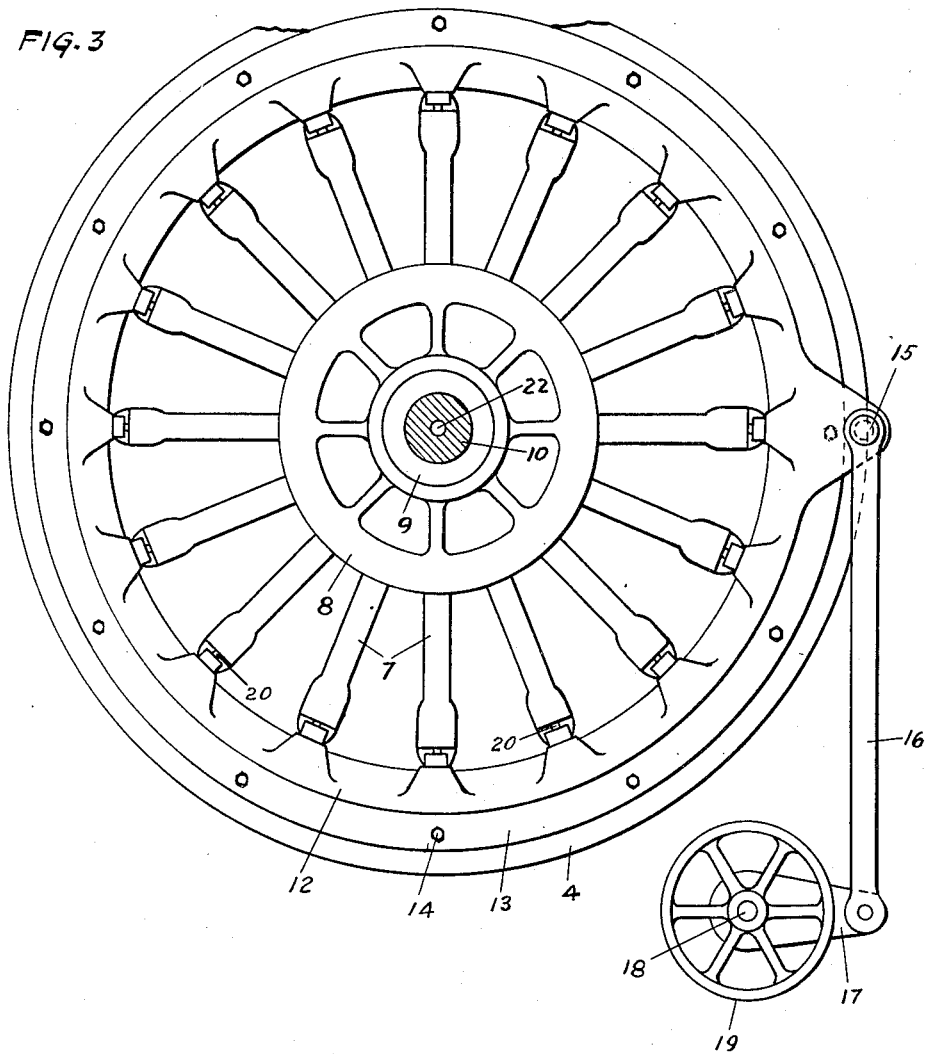
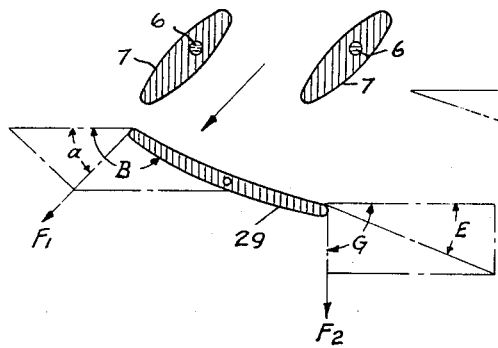
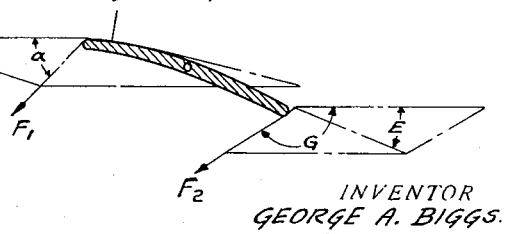

Patented Mar. 13, 1934

1,950,775

UNITED STATES PATENT OFFICE 1,950,775

HYDRAULIC TURBINE

George A. Biggs, Springfield, Ohio, assignor to The James Leffel & Company, Springfield, Ohio, a corporation of Ohio Application December 15, 1932, Serial No. 657,350

31 Claims. (Cl. 253—144)

My invention relates to hydraulic turbines.

In particular, it is my object to provide a hydraulic turbine in which the buckets are self adjusting.

It is the object of my invention to provide means tending to close the self adjusting buckets which are opened according to the quantity of water delivered to the buckets.

It is a further object to provide in such a combination means of regulating the amount of water entering the turbine to affect the buckets.

It is a further object to provide a plurality of gates having their axes substantially parallel to the axes of the buckets adapted to deliver water on to the buckets and through the buckets to cause the buckets to rotate with the runner hub, which buckets are self adjusting and have means, such as a weight, tending to close them.

It is my object to provide a turbine which can be utilized in low, medium or high specific speeds by suitably adjusting the curvature of the runner buckets.

The curvature of the buckets may be such that they are concave on top and convex on the bottom or convex on top and concave on the bottom without departing from the principles involved.

The use of the particular curvature of the buckets depends upon the conditions which are to be met in the particular installation.

Referring to the drawings:

Figure 1 is a vertical section through the draft tube and runner;

Figure 2 is a section on the line 2—2 of Figure 1 showing the gate arrangement;

Figure 3 is a top plan view of the runner with the runner shaft in section;

Figure 4 is a section on the line 4—4 of Figure 1 showing the relationship between the gates and the buckets;

Figure 5 is a section through the runner bucket on the line 4—4 showing a modified form of reverse curvature bucket.

Referring to the drawings in detail, 1 is the concrete forming the foundation of the power house in which a draft tube 2 is located. Mounted on the foundation 1 is a ring having a vertical portion 3 forming a continuation of the draft tube and a horizontal portion 4. These several portions constitute the foundation ring upon which rests an outer gate ring 5 carrying a plurality of diagonally-disposed axles 6 for the gates 7 which are pivoted thereon. The inner ends of these axles support the inner gate ring 8 which in turn supports the runner shaft bearing 9 aligning and positioning the runner shaft 10. Mounted on the outer gate ring 5 within the shoulder 11 is a gate actuating ring 12 held in position by the overlapping blade 13 and bolts 14 upon the outer gate ring 5. Connected to the gate actuating ring 12 is a stud pin 15, a pitman 16, a lever 17, a shaft 18 and an actuating hand wheel or governor 19.

This actuating ring 12 is provided with a plurality of gate pins 20 which engage the gates at one end thereof in order to rotate them on the axle 6 and adjust the amount of opening through the gates through which the water flows from the head waters 21.

The runner itself comprises a shaft 10 having an air vent opening 22 comprising a passage that extends from above the head waters 21 to the bottom of the shaft 10. To the runner blade shaft 23 is bolted by the bolts 24 a hub cap 25 which in turn is bolted by the bolts 26 to the hub 27. This hub has journaled in its sides the shafts 28 carrying the buckets 29. On the inner ends of these shafts 28 are pinions 30 which mesh with racks 31. The inner ends of the shafts 28 are journaled in the common shaft block 32 which carries a bearing 33. This bearing is used to guide a reciprocating shaft 34 which carries a plate 35 that supports the racks 31. The plate is provided with apertures 36 which are restricted to restrict the passage of oil therethrough from the chamber 37 to the chamber 38 and vice versa. Thus, a dash pot is formed. The air from the top of the dash pot is relieved through the passageway 22 in the runner shaft 10 to prevent compression or suction. The lower end of the shaft 34 passes through the seal 39 in the bottom of the hub 27 and depends below the runner hub carrying on its lower end a weight 40 that is a continuation of the streamline surface of the hub 27 and has its upper end 41 enclosed within the skirt 42 of the hub 27. This skirt is provided with a plurality of ports 43 to prevent the space between the weight 40 and the hub 27 becoming air bound or water bound.

The weight 40 tends to rotate the buckets 29 to their closed position so that they overlap and prevent the passage of water through the draft tube irrespective of the position of the gates 7.

The buckets are so adjusted and so balanced that the greater the amount of water entering the buckets the greater the buckets will dip downwardly at their trailing edges 44 as there is a larger area toward the trailing side of the bucket with respect to the axis 45 than toward the leading edge of the bucket and, therefore, the greater quantity of water admitted the greater the opening of the buckets.

In other words, the area A is lesser in extent than the area B and the area D is lesser in extent than the area C so that, as more water enters and therefore extends from the tip of the buckets progressively towards the hub, the greater the area affected by the water on the trailing side which tends to open it as the area C adjacent the hub on the trailing side is greater than the area D adjacent the hub on the leading edge side.

It is, therefore, apparent that my invention comprises as one of its principal features means tending to close the buckets which are opened more and more according to the greater quantity of water being admitted by the gates 7. In this manner the buckets are self adjusting to a position where they will render the maximum service according to the flow thereover and thereby permit of the maintenance of a constant head in the head waters.

It will be understood that I desire to comprehend within my invention such modifications as may be necessary to adapt it to varying conditions and uses.

Where high speed is required and where R is considerably greater than R2, it may be necessary to make the bucket convex on top and concave on the bottom. Whereas, in a slow speed runner, it may require concavity on the top and convexity on the bottom.

Having thus fully described my invention, what I claim as new and desire to secure by Letters Patent, is:

1. In a hydraulic turbine, a runner, adjustable buckets, a weight beneath the runner tending to move the buckets to a closed position to prevent the passage of water thereover.

2. In a hydraulic turbine, a runner, adjustable buckets, a weight beneath the runner tending to move the buckets to a closed position to prevent the passage of water thereover, said buckets being so formed that the greater the quantity of water admitted to them the wider they tend to open to pass the water therethrough against the tendency of the means to close the buckets.

3. In a hydraulic turbine, a runner, adjustable buckets, a weight beneath the runner tending to move the buckets to a closed position to prevent the passage of water thereover, said buckets being so formed that the greater the quantity of water admitted to them the wider they tend to open to pass the water therethrough against the tendency of the means to close the buckets, and means of causing the buckets to move as a unit.

4. In a hydraulic turbine, a runner, adjustable buckets, a weight beneath the runner tending to move the buckets to a closed position to prevent the passage of water thereover, said buckets being so formed that the greater the quantity of water admitted to them the wider they tend to open to pass the water therethrough against the tendency of the means to close the buckets, means of causing the buckets to move a unit, and dash pot means to prevent the fluctuation of the buckets in their movements and to regulate and steady the movements.

5. In a hydraulic turbine, a runner, adjustable buckets, a weight beneath the runner tending to move the buckets to a closed position to prevent the passage of water thereover, said buckets being so formed that the greater the quantity of water admitted to them the wider they tend to open to pass the water therethrough against the tendency of the means to close the buckets, means of causing the buckets to move as a unit, dash pot means to prevent the fluctuation of the buckets and their movements and to regulate and steady the movements, and means to remove air from the dash pot and maintain it under atmospheric pressure.

6. In a hydraulic turbine runner, a shaft, a hub, a plurality of buckets rotatably mounted in said hub adapted to open in proportion to the amount of water admitted to the buckets, and weight means connected to said buckets adapted to close them and forming a continuation of the surface of the hub.

7. In a hydraulic turbine runner, a shaft, a hub, a plurality of buckets rotatably mounted in said hub adapted to open in proportion to the amount of water admitted to the buckets, weight means connected to said buckets adapted to close them, said weight means being suspended below the runner hub but in line therewith.

8. In a hydraulic turbine runner, a shaft, a hub, a plurality of buckets rotatably mounted in said hub adapted to open in proportion to the amount of water admitted to the buckets, weight means connected to said buckets adapted to close them, said weight means being suspended below the runner hub but in line therewith, said hub having a chamber therein to form a dash pot chamber, and means connecting the weight to the buckets and interconnecting the buckets comprising a dash pot member in said chamber.

9. In a hydraulic turbine runner, a shaft, a hub, a plurality of buckets rotatably mounted in said hub adapted to open in proportion to the amount of water admitted to the buckets, weight means connected to said buckets adapted to close them, said weight means being suspended below the runner hub but in line therewith, said hub having a chamber therein to form a dash pot chamber, means connecting the weight to the buckets and interconnecting the buckets comprising a dash pot member in said chamber, and means supported by the inner ends of the buckets within the dash pot chamber adapted to guide said weight supporting means.

10. In combination in a turbine runner of a runner shaft, a hollow hub suspended therefrom, said shaft having a port therethrough leading from the hub to a point above the head waters, a plurality of buckets pivoted on said hub having their shafts extending into the hub, said buckets being arranged to open in proportion to the amount of water flowing thereover, a bearing block mounted on the inner ends of the bucket shafts, a reciprocating shaft carried thereby depending from below the hub, a weight on the lower end of said shaft, racks engaging said pinions on the inner end of said shaft, and a piston on said shaft having ports therein.

11. In a hydraulic turbine, a runner, adjustable buckets, a weight having a surface continuous with the surface of the runner tending to move the buckets to a closed position to prevent the passage of water thereover, and adjustable gates adapted to direct varying quantities of water to said runner buckets.

12. In a hydraulic turbine, a runner, adjustable buckets, a weight having a surface continuous with the surface of the runner tending to move the buckets to a closed position to prevent the passage of water thereover, said buckets being so formed that the greater the quantity of water admitted to them the wider they tend to open to pass the water therethrough against the tendency of the weight to close the buckets, and adjustable gates adapted to direct varying quantities of water to said runner buckets.

13. In a hydraulic turbine, a runner, adjustable buckets, a weight having a surface continuous with the surface of the runner tending to move the buckets to a closed position to prevent the passage of water thereover, said buckets being so formed that the greater the quantity of water admitted to them the wider they tend to open to pass the water therethrough against the tendency of the weight to close the buckets, means of causing the buckets to move as a unit, and adjustable gates adapted to direct varying quantities of water to said runner buckets.

14. In a hydraulic turbine, a runner, adjustable buckets, a weight having a surface continuous with the surface of the runner tending to move the buckets to a closed position to prevent the passage of water thereover, said buckets being so formed that the greater the quantity of water admitted to them the wider they tend to open to pass the water therethrough against the tendency of the weight to close the buckets, means of causing the buckets to move as a unit, dash pot means to prevent the fluctuation of the buckets in their movements and to regulate and steady the movements, and adjustable gates adapted to direct varying quantities of water to said runner buckets.

15. In a hydraulic turbine, a runner, adjustable buckets, a weight having a surface continuous with the surface of the runner tending to move the buckets to a closed position to prevent the passage of water thereover, said buckets being so formed that the greater the quantity of water admitted to them the wider they tend to open to pass the water therethrough against the tendency of the weight to close the buckets, means of causing the buckets to move as a unit, dash pot means to prevent the fluctuation of the buckets in their movements and to regulate and steady the movements, means to remove air from the dash pot and maintain it under atmospheric pressure, and adjustable gates adapted to direct varying quantities of water to said runner buckets.

16. In a hydraulic turbine runner, a shaft, a hub, a plurality of buckets rotatably mounted in said hub adapted to open in proportion to the amount of water admitted to the buckets, a weight having a surface continuous with the surface of the hub connected to said buckets adapted to close them, and adjustable gates adapted to direct varying quantities of water to said runner buckets.

17. In a hydraulic turbine runner, a shaft, a hub, a plurality of buckets rotatably mounted in said hub adapted to open in proportion to the amount of water admitted to the buckets, a weight having a surface continuous with the surface of the hub connected to said buckets adapted to close them, said weight means being suspended below the runner hub but in line therewith, and adjustable gates adapted to direct varying quantities of water to said runner buckets.

18. In a hydraulic turbine runner, a shaft, a hub, a plurality of buckets rotatably mounted in said hub adapted to open in proportion to the amount of water admitted to the buckets, weight means connected to said buckets adapted to close them, said weight means being suspended below the runner hub but in line therewith, said hub having a chamber therein to form a dash pot chamber, means connecting the weight to the buckets and interconnecting the buckets comprising a dash pot member in said chamber, and adjustable gates adapted to direct varying quantities of water to said runner buckets.

19. In a hydraulic turbine runner, a shaft, a hub, a plurality of buckets rotatably mounted in said hub adapted to open in proportion to the amount of water admitted to the buckets, weight means connected to said buckets adapted to close them, said weight means being suspended below the runner hub but in line therewith, said hub having a chamber therein to form a dash pot chamber, means connecting the weight to the buckets and interconnecting the buckets comprising a dash pot member in said chamber, means supported by the inner ends of the buckets within the dash pot chamber adapted to guide said weight supporting means, and adjustable gates adapted to direct varying quantities of water to said runner buckets.

20. In combination in a turbine runner of a runner shaft, a hollow hub suspended therefrom, said shaft having a port therethrough leading from the hub to a point above the head waters, a plurality of buckets pivoted on said hub having their shafts extending into the hub, said buckets being arranged to open in proportion to the amount of water flowing thereover, a bearing block mounted on the inner ends of the bucket shafts, a reciprocating shaft carried thereby depending from below the hub, a weight on the lower end of said shaft, racks engaging said pinions on the inner end of said shaft, a piston on said shaft having ports therein, and adjustable gates adapted to direct varying quantities of water to said runner buckets.

21. In combination, outer and inner gate rings, a plurality of axles supporting the inner ring on the outer ring, a gate on each axle, a gate adjusting ring mounted on the outer ring engaging each gate, a runner shaft aligned by the inner gate ring, a hub mounted thereon, a plurality of self adjusting buckets mounted on said hub.

22. In combination, outer and inner gate rings a plurality of axles supporting the inner ring on the outer ring, a gate on each axle, a gate adjusting ring mounted on the outer ring engaging each gate, a runner shaft aligned by the inner gate ring, a hub mounted thereon, a plurality of self adjusting buckets mounted on said hub, and means tending to close said buckets, said buckets being so arranged that in proportion to the amount of water admitted by the gates they tend to open against the gate closing means.

23. In combination, outer and inner gate rings, a plurality of axles supporting the inner ring on the outer ring, a gate on each axle, a gate adjusting ring mounted on the outer ring engaging each gate, a runner shaft aligned by the inner gate ring, a hub mounted thereon, a plurality of self adjusting buckets mounted on said hub, and means tending to close said buckets, said buckets being so arranged that in proportion to the amount of water admitted by the gates they tend to open against the gate closing means, the axes of said buckets and said gates being substantially parallel.

24. In combination, outer and inner gate rings, a plurality of axles supporting the inner ring on the outer ring, a gate on each axle, a gate adjusting ring mounted on the outer ring engaging each gate, a runner shaft aligned by the inner gate ring, a hub mounted thereon, a plurality of self adjusting buckets mounted on said hub, and means tending to close said buckets, said buckets being so arranged that in proportion to the amount of water admitted by the gates they tend to open against the gate closing means, the axes of said buckets and said gates being substantially parallel in a generally horizontal plane.

25. In combination, outer and inner gate rings, a plurality of axles supporting the inner ring on the outer ring, a gate on each axle, a gate adjusting ring mounted on the outer ring engaging each gate, a runner shaft aligned by the inner gate ring, a hub mounted thereon, a plurality of self adjusting buckets mounted on said hub, and means tending to close said buckets, said buckets being so arranged that in proportion to the amount of water admitted by the gates they tend to open against the gate closing means, the axes of said buckets and said gates being substantially parallel in a generally horizontal plane directed outwardly and downwardly.

26. In combination, a plurality of adjustable gates, a plurality of adjustable runner buckets, a suspended weight acting with uniform force to close said buckets to cut off the flow of water as admitted by the gates, said buckets being so arranged that the greater the quantity of water admitted by the gates the greater the opening of the buckets.

27. In combination, a foundation ring, an outer gate ring, a gate adjusting ring, an inner gate ring, a plurality of diagonal axles adapted to support said inner gate ring on the outer gate ring above the outer gate ring, gates on said axles connected to the gate adjusting ring, a plurality of self adjusting runner buckets in substantial parallelism with said gates, a shaft aligned by the inner gate ring, a hub adapted to support said buckets depending from said shaft below the inner gate ring and in alignment therewith.

28. In combination, a foundation ring, an outer gate ring, a gate adjusting ring, an inner gate ring, a plurality of diagonal axles adapted to support said inner gate ring on the outer gate ring above the outer gate ring, gates on said axles connected to the gate adjusting ring, a plurality of self adjusting runner buckets in substantial parallelism with said gates, a shaft aligned by the inner gate ring, a hub adapted to support said buckets depending from said shaft below the inner gate ring and in alignment therewith and a weight depending from said buckets below said hub tending to close the buckets, said weight being substantially in alignment with the streamline surface of said hub.

29. In combination in a hydraulic turbine, means to direct water over the turbine axially, a plurality of adjustable gates adapted to control the axial flow of the water, a plurality of self adjusting buckets adapted to receive the axial flow of the water, a suspended weight acting with uniform force to close said buckets, said buckets being so arranged that the greater the flow of water thereover, the greater the tendency of the buckets to open.

30. In combination in a hydraulic turbine, means to direct water over the turbine axially, a plurality of adjustable gates adapted to control the axial flow of the water, a plurality of self adjusting buckets adapted to receive the axial flow of the water, a suspended weight acting with uniform force to close said buckets, said buckets being so arranged that the greater the flow of water thereover, the greater the tendency of the buckets to open, and means to carry away the water below the buckets in a downwardly and outwardly expanding body.

31. In combination in a hydraulic turbine, means to direct water over the turbine axially, a plurality of adjustable gates adapted to control the axial flow of the water, a plurality of self adjusting buckets adapted to receive the axial flow of the water, a suspended weight acting with uniform force to close said buckets, said buckets being so arranged that the greater the flow of water thereover, the greater the tendency of the buckets to open, means to carry away the water below the buckets in a downwardly and outwardly expanding body, and means to guide the water to the gates and buckets in an inwardly and downwardly converging body.

GEORGE A. BIGGS.